US010817219B2

(12) United States Patent
Nukala et al.

(10) Patent No.: US 10,817,219 B2
(45) Date of Patent: Oct. 27, 2020

(54) MEMORY ACCESS SCHEDULING USING A LINKED LIST

(71) Applicant: Apple Inc., Cupertino, CA (US)

(72) Inventors: Lakshmi Narasimha Murthy Nukala, Pleasanton, CA (US); Sukalpa Biswas, Fremont, CA (US); Thejasvi Magudilu Vijavaraj, Santa Clara, CA (US); Shane J. Keil, San Jose, CA (US); Gregory S. Mathews, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 16/129,735

(22) Filed: Sep. 12, 2018

(65) Prior Publication Data

US 2020/0081652 A1    Mar. 12, 2020

(51) Int. Cl.
*G06F 3/06* (2006.01)
*G06F 13/16* (2006.01)
*G06F 9/48* (2006.01)
*G06F 9/54* (2006.01)

(52) U.S. Cl.
CPC .......... *G06F 3/0659* (2013.01); *G06F 3/0613* (2013.01); *G06F 3/0656* (2013.01); *G06F 3/0679* (2013.01); *G06F 9/4881* (2013.01); *G06F 9/544* (2013.01); *G06F 13/1642* (2013.01)

(58) Field of Classification Search
None
See application file for complete search history.

(56) References Cited

U.S. PATENT DOCUMENTS

| | | | |
|---|---|---|---|
| 6,704,821 B2 | 3/2004 | Scandurra et al. | |
| 7,529,224 B2 | 5/2009 | Basso et al. | |
| 8,615,629 B2 | 12/2013 | Sukonik et al. | |
| 8,775,754 B2 | 7/2014 | Campbell et al. | |
| 9,270,488 B2 * | 2/2016 | Lamb | H04L 12/467 |
| 9,306,876 B1 * | 4/2016 | Ulman | H04L 49/90 |
| 2012/0051366 A1 * | 3/2012 | Li | H04L 49/9015 |
| | | | 370/412 |
| 2016/0283157 A1 | 9/2016 | Kanai et al. | |
| 2019/0042410 A1 * | 2/2019 | Gould | G06F 12/0895 |

* cited by examiner

*Primary Examiner* — Idriss N Alrobaye
*Assistant Examiner* — Dayton Lewis-Taylor
(74) *Attorney, Agent, or Firm* — Kowert, Hood, Munyon, Rankin & Goetzel, P.C.

(57) ABSTRACT

A memory controller circuit coupled to multiple memory circuits may receive a read request for a particular one of the memory circuits and insert the read request into one of multiple linked lists that includes a linked list whose entries correspond to previously received read requests and are linked according to respective ages of the read requests. The memory controller circuit may schedule the read request using a head pointer of one of the multiple linked lists.

20 Claims, 10 Drawing Sheets

MEMORY ACCESS SCHEDULING USING A LINKED LIST

BACKGROUND

Technical Field

The embodiments described herein generally relate to memory access within computing systems, and more particularly, to scheduling memory access requests using linked lists.

Description of the Relevant Art

Computing systems including systems-on-a-chip (SoCs), include processors and multiple memory circuits that store software programs or applications, as well as data being operated on by the processors. Such memory circuits may vary in storage capacity as well as access time. In some computing systems, some memory circuits are coupled to the processors via a memory controller circuit communicating with the processors via a communication link or other communication network.

During operation, the processors, which may include processor cores, graphics processors, and the like, transmit requests for access to the memory controller via the communication link. Such requests may include requests to retrieve previously stored data from the memory circuits or requests to store new data in the memory circuits. The memory controller receives the requests and arbitrates access to the memory circuits for the requests based on various criteria. Upon relaying a particular request from a processor to the memory circuits, the memory controller circuit waits until the memory circuits have completed the particular request, at which point the memory controller circuit sends an acknowledged signal and, in the case of a read access, requested data to the processor that initiated the request. In some cases, the memory controller circuit may acknowledge a write request before data associated with the write request has been written to memory in a procedure commonly referred to as "posting a write."

SUMMARY OF THE EMBODIMENTS

Various embodiments of a computing system are disclosed. Broadly speaking, an apparatus and a method are contemplated, in which a memory controller circuit is configured to receive a read request for a particular memory circuit of a plurality of memory circuits, insert the read request into at least one linked list of a plurality of linked, wherein a particular linked list includes a plurality of read requests linked according to their respective ages, and schedule a previously received read request based on at least one head pointer of a given one of the plurality of linked lists. In one embodiment, to schedule the previously received read request, the memory controller circuit is further configured to skip the previously received read request, in response to a determination that the previously received read request is blocked by a pending write request, increment a pointer for the given linked list based on a link included an entry in the given linked list corresponding to the previously received read request, and schedule a different read request based on the pointer for the given linked list. In another non-limiting embodiment, the memory controller circuit is further configured to relink, in the given linked list, the previously received read request to another previously received read request, in response to scheduling the different read request.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

During operation of a computing system, processors, processor cores, and other processing circuits generate requests to access memory circuits (commonly referred to as "memory access requests"). Such requests may be to store data into a memory circuit, retrieve program instructions from the memory circuit, retrieve data from the memory circuit for further processing, retrieve data from the memory circuit for display, speculative retrieval from the memory circuit of program instructions or data to fill cache memories, and the like. Depending on the type of information being stored or retrieved, or the purpose for which retrieved information is being used, a priority level may be assigned a particular memory access request through the use of virtual channels, which specify a quality-of-service level for the particular memory access request.

In order to satisfy the desired quality-of-service levels, a memory controller circuit may arbitrate access to a memory circuit by selecting a particular memory access request to send to the memory circuit based on the memory access request's assigned virtual channel, address to be accessed, and the like. To perform such arbitration, the memory controller circuit may examine multiple memory access requests before selecting the particular memory access request. In some cases, the more memory access requests that can be examined, the better the arbitration result, and the better utilization of the memory circuit's available bandwidth.

Examining large numbers of memory access requests, however, may involve the use of deep input queue circuits in the memory controller circuit. Such deep queue circuits, while able to store large numbers of memory access requests, become difficult to quickly traverse, resulting in longer times to arbitrate access to the memory circuit. The embodiments illustrated in the drawings and described below may provide techniques for using linked lists of memory access requests to arbitrate access to a memory circuit, thereby reducing arbitration time while maintaining a desired level of memory circuit utilization.

Figure 1:
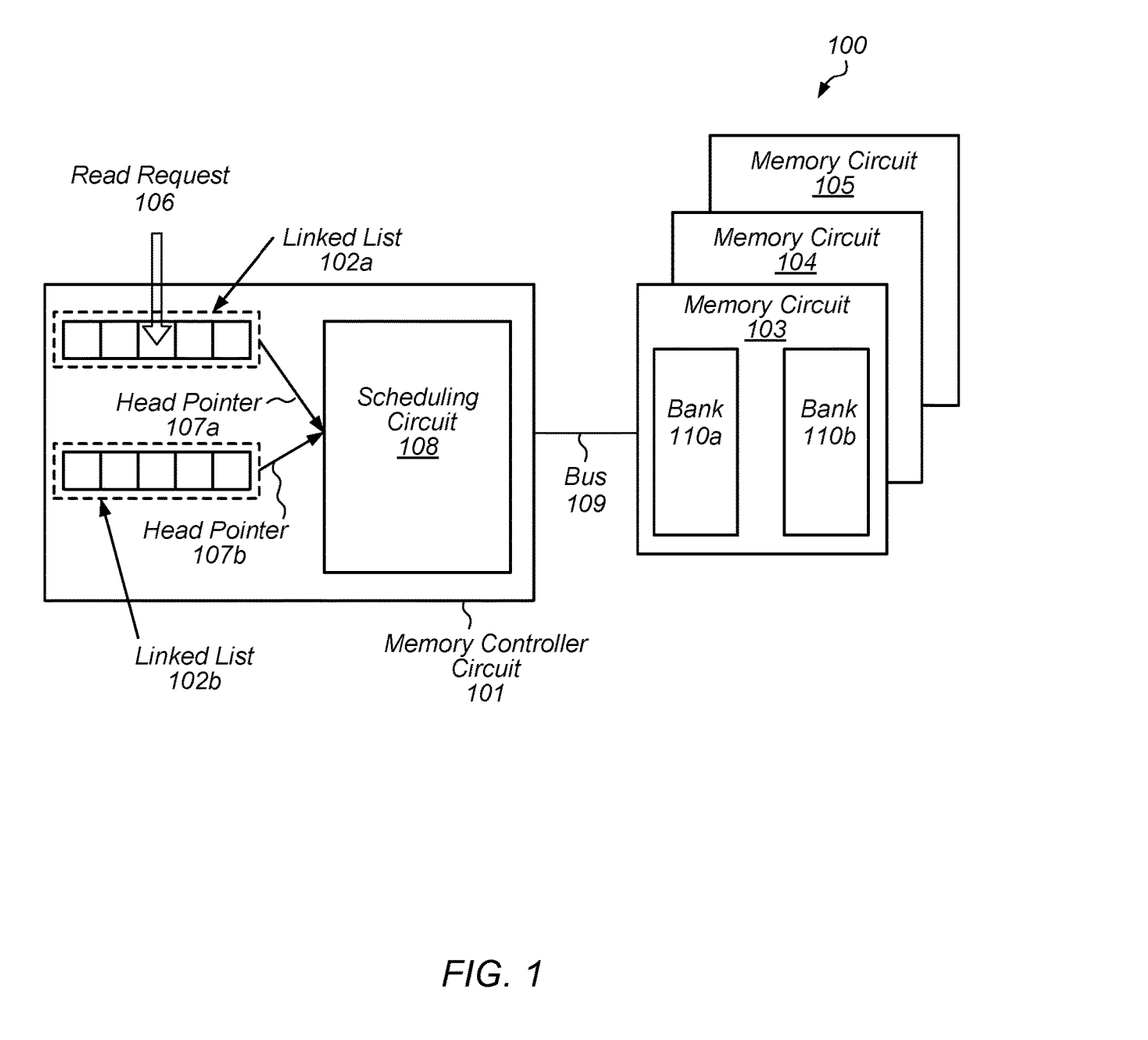
FIG. 1 is a generalized block diagram illustrating an embodiment of a memory system.

A block diagram of an embodiment of a memory system is illustrated in FIG. 1. As shown, memory system 100 includes memory controller circuit 101, which is coupled to memory circuits 103-105 via bus 109.

Each of memory circuits 103-105 may be a particular embodiment of multi-bank memory circuits, where a bank includes multiple data storage cells. For example, memory circuit 103 includes banks 110a-b, each of which includes multiple data storage cells. Banks 110a-b may, in some cases, be accessed (either for data retrieval or storage) in parallel. In various embodiments, memory circuits 103-105 may be dynamic random-access memories (DRAMs), static random-access memories (SRAMs), read-only memories (ROMs), Flash memories, or any other suitable type of memory circuit.

As described below in more detail, memory controller circuit 101 includes various circuits that are capable of performing various functions such that memory controller circuit 101 is configured to receive a request for a particular memory circuit of a plurality of memory circuits. For example, as depicted, memory controller circuit 101 receives read request 106, which specifies access to memory circuit 103. As used and defined herein, a read request is a request from a particular processor, processor core, or other agent within a computer system to retrieve data stored at a particular location in memory, which may be specified by an address or other suitable information. The read request may specify an amount of data to be retrieved starting from the address. In various embodiments, the read request may be formatted according to a communication protocol used by functional circuit blocks within the computer system to communication requests and associated responses.

Memory controller circuit 101 is also configured to insert the read request into a least one linked list of a plurality of linked lists, wherein a particular linked list includes a plurality of read requests linked according to respective ages of the plurality of read requests. Memory controller circuit 101 may schedule a previously received read request based on at least one head pointer of a given linked list of the plurality of linked lists. A head pointer, as used herein, refers to a pointer specifying a location of a head (or "first") entry of a linked list. Additionally, as used herein, scheduling a read request refers to a one or more operations performed to select a given read request, generate, based on the read request, specific commands to be sent to one or more memory circuits, and send the specific commands to the one or more memory circuits.

For example, memory controller circuit 101 inserts read request into linked list 102a. Scheduling circuit 108, which is described below in more detail, uses head pointers 107a-b to schedule a read request stored in linked lists 102a-b. Each of linked lists 102a-b include multiple read requests linked together based on a particular criterion, such as, age of the read requests, bank, and/or quality-of-service level, for example. As a read request is added to a linked list, existing links within the linked list are updated to order the read request within the list according to an ordering criterion of the linked list. Although only two linked lists are depicted in the embodiment illustrated in FIG. 1, in other embodiments, any suitable number of linked lists, each with a different ordering criterion may be employed.

Scheduling circuit 108 receives head pointer 107a, which specifies a head entry in linked list 102a. Additionally, scheduling circuit 108 receives head pointer 107b, which specifies a head entry of linked list 102b. Using head pointers 107a-b, scheduling circuit 108 may schedule a particular read request from either of linked lists 102a-b to be sent to memory circuits 103-105.

In some cases, the previously received read request that could be scheduled may be blocked by a pending write request. When this occurs, memory controller circuit 101 may be further configured to skip the previous read request, increment a pointer for the given linked list based on a link included in the given linked list corresponding to the previously received read request, and schedule a different read request based on the pointer for the given linked list. By incrementing the pointer in this fashion, memory controller circuit 101 may continue to schedule read requests to the memory and not stall because a particular read request could not be performed Once the different read request is scheduled, memory controller circuit 101 may relink the previously received read request to the next read request in the linked list, which follows the scheduled read request. By relinking the previously received read request, the different read request is effectively removed from the given linked list and eliminated from further scheduling.

The embodiment depicted in FIG. 1 is merely an example. In other embodiments, different numbers of memory circuits and different number of linked lists may be employed.

Figure 2:
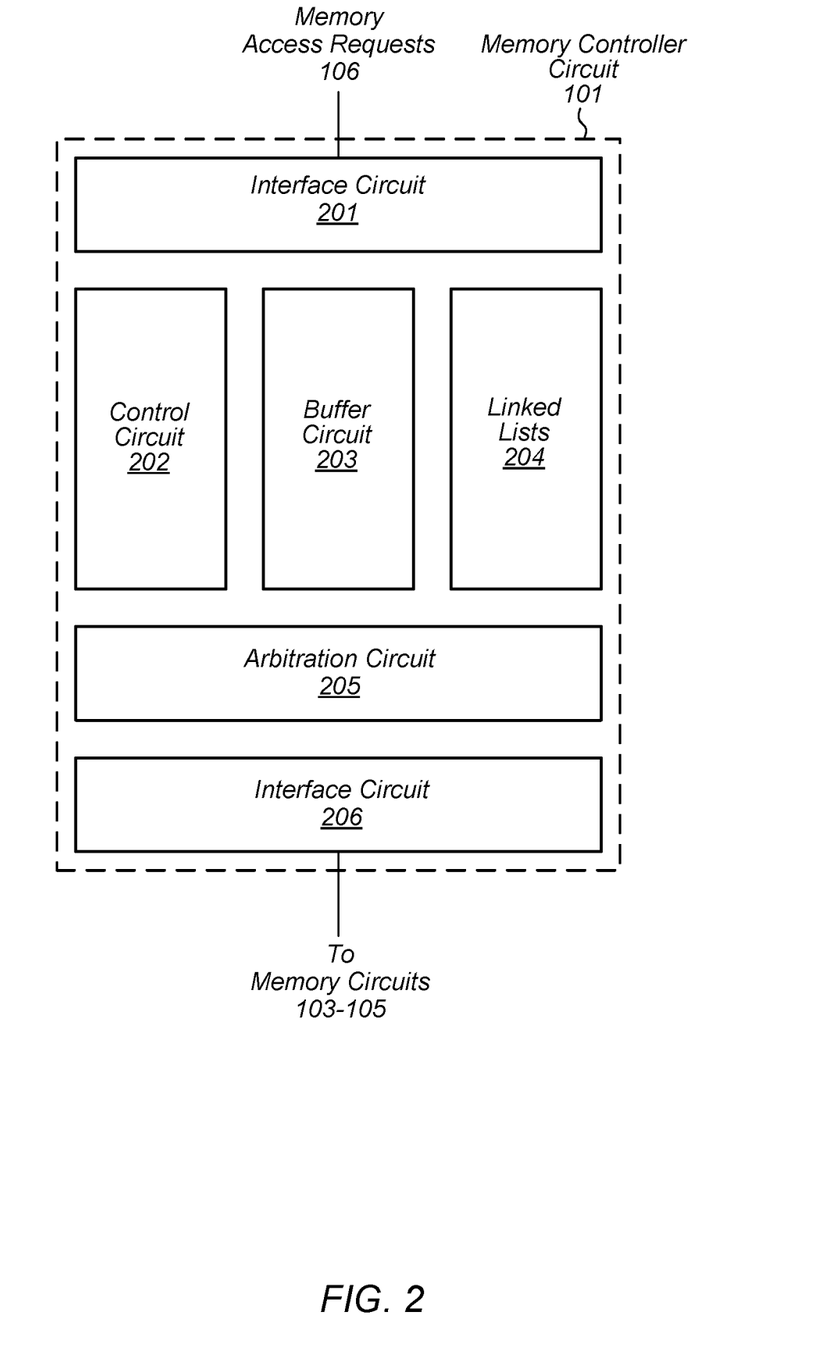
FIG. 2 illustrates a block diagram depicting an embodiment of a memory controller circuit.

A block diagram of memory controller circuit 101 is illustrated in FIG. 2. As shown, memory controller circuit 101 includes interface circuit 201, control circuit 202, buffer circuit 203, linked lists 204, arbitration circuit 205, and interface circuit 206. In various embodiments, control circuit 202, buffer circuit 203, and arbitration circuit 205 may be included in scheduling circuit 108 as depicted in FIG. 1.

Interface circuit 201 is a particular embodiment of a state machine or other sequential logic circuit and is configured to receive memory access requests, specifically read access requests from a processor, processor core, or other suitable agent in a computer system including memory controller circuit 101. In various embodiments, interface circuit 201 may receive multiple payload packets as part of a memory access requests and reassemble a complete version of the memory access request upon receiving all of the payload packets.

Control circuit 202 may be a particular embodiment of a state machine or other sequential logic configured to perform various functions in regard to the management of linked lists 204. Such functions may allow memory controller circuit 101 to ensure forward progress of read requests, take advantage of read requests to a same memory page, and the like.

For example, in some embodiments, control circuit 202 is configured to select a previously received read request in response to a determination that an age of the previously received read request is greater than a threshold value. By comparing ages of read requests, control circuit 202 ensures that read requests are not left unscheduled indefinitely but will move forward and be scheduled at some point.

Additionally, control circuit 202 may track a number of accesses schedule to a common page within a memory. As used and described herein, a memory page (or simply a "page") is a collection of data storage cells in a memory that may be activated (or "sensed") based on a single address value. For example, in dynamic random-access memories, a page corresponds to a set of data storage cells coupled to a common word line that is activated based on a particular row and bank address value. Control circuit 202 may be configured to compare a number of read requests to a particular page of a plurality of pages included in the plurality of memory circuits to a threshold number. When the number of accesses to a particular page exceeds the threshold number, it may be an indication that other users of the bank may be experiencing an extended latency, particularly if the accesses to the page are not back-to-back in age-order. In such cases, further scheduling of read requests to the particular page is halted and read requests directed to other pages may be scheduled. By making such a comparison, control circuit 202 accesses to other pages are guaranteed access at some point in time.

Buffer circuit 203 may be a particular embodiment of a memory circuit or other suitable storage circuit that is used store read requests associated with page hits. As described below in more detail, multiple read requests may be directed to a common page within memory circuits 103-105. For example, in dynamic random-access memories, a page corresponds to a set of data storage cells coupled to a common word line that is activated based on a particular address value.

Each time a read request is scheduled for a currently open page, a page hit is generated. Using a buffer circuit, such as, e.g., buffer circuit 203, allows memory controller circuit 101 to be configured to store a next entry in a given linked list, in response to a determination that the at least one head pointer is associated with a page hit linked list included in the plurality of linked lists, thereby improving the processing of read requests that target a common page.

As described below in more detail, linked lists 204 may be a particular embodiment of a register file or other suitable storage circuit configured to store multiple read requests and maintain links between the stored read requests based on various criteria. For example, linked lists 204 may include a linked list, in which stored read requests are linked in an order corresponding to their respective durations (or ages) the read requests have been stored in linked lists 204.

Arbitration circuit 205 is configured to schedule a particular read request by selecting a read request stored in linked lists 204. In various embodiments, arbitration circuit 205 may select the read request based on values of head pointers for the individual linked lists included in linked lists 204 along with other various criteria. In some cases, arbitration circuit may include numerous multiplex circuits configured to select particular ones of read requests stored in linked lists 204 using the above-referenced head points and criteria.

Interface circuit 206 is configured to generate one or more memory commands (commonly referred to as "atomic commands") based on a memory access requests and send the one or more memory commands to memory circuits 103-105. For example, a read request may result in the generation of an open page command, a read command for at least a portion of the open page, and a close page command. In various embodiments, interface circuit 206 may format and send the memory commands according to one of various communication protocols, such as a double data rate (DDR) communication protocol, for example. Interface circuit 206, which may be a particular embodiment of a state machine or sequential logic circuit, may also be configured to receive data from memory circuit 103-105 and relay the data to interface circuit 201 for transmission to a requesting processor, processor core, or other agent in the computer system.

It is noted that the embodiment depicted in FIG. 2 is merely an example and that partitioning of functionality amongst the depicted blocks is for the purposes of explanation. In other embodiments, the functionality of memory controller circuit 101 may be divided amongst different circuit blocks and different numbers of circuit blocks.

As previously mentioned, memory controller circuit 101 may employ multiple different linked lists. Such linked lists may correspond to different physical or virtual structures within a memory system. An embodiment of linked lists 204 is illustrated in the block diagram of FIG. 3. As shown, linked lists 204 includes three different categories of linked lists, namely bank linked lists 302, virtual channel linked lists 303, and page hit linked lists 304.

Figure 3:
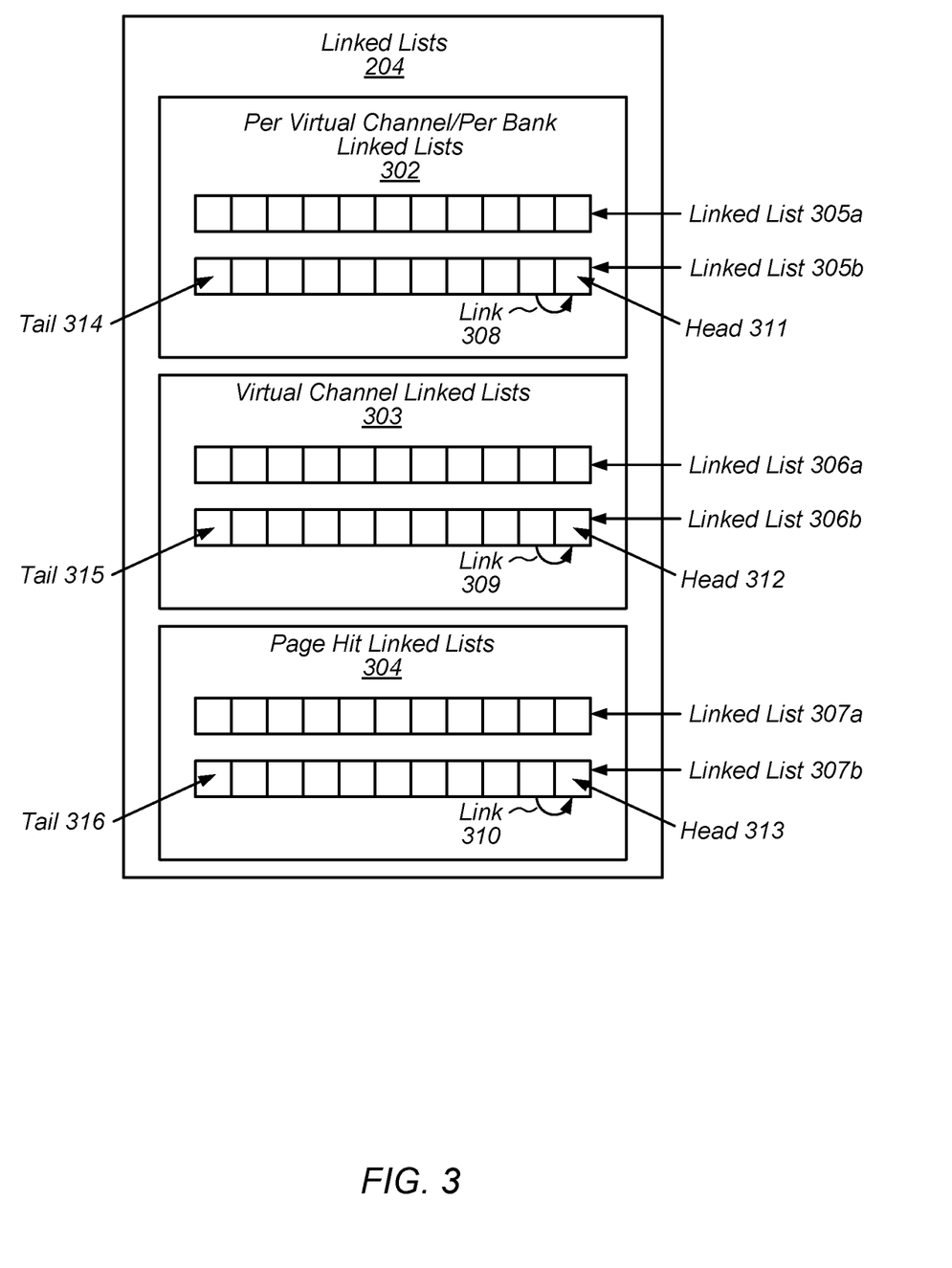
FIG. 3 illustrates a block diagram depicting an embodiment of linked lists used by a memory controller circuit.

Per virtual channel/per bank linked lists 302 includes linked lists 305a-b, each of which correspond to read requests associated with a particular virtual channel for a particular bank. For example, linked list 305b may include read requests for low latency read transactions directed to bank 105b of memory circuit 103 as illustrated in FIG. 1. Each of linked lists 305a-b includes a head (or "first") entry and a tail (or "last") entry. For example, linked list 305b includes head 311 and tail 314.

Within each of linked lists 305a-b, read requests are ordered according their respective ages, with older read requests being closer to head 311. For example, link 308 links a read request to a next older read request. It is noted that for the sake of clarity, only a single link has been depicted. By organizing read requests for each bank by age and associated virtual channel, a memory controller circuit may ensure desired bandwidth levels for each virtual channel as well as ensuring desired levels of bank utilization within a given memory circuit.

Virtual channel linked lists 303 includes linked lists 306a-b, each of which correspond to a respective virtual channel of multiple virtual channels associated with the read requests. For example, linked list 306a may include read request assigned to a low latency transaction (or simply "LLT") virtual channel. Each list includes a head entry and a tail entry in the list. For example, linked list 306b includes head 312 and tail 315.

Within each of linked lists 306a-b, read requests are ordered according to their respective ages, i.e., older read requests are closer to head 312 of the list. For example, link 309 links a read request to a next older read request. It is noted that only a single link is shown for the purposes of clarity. By organizing read requests according to both age and virtual channel, a memory controller circuit, such as, e.g., memory controller circuit 101, can select an older transaction with a higher quality-of-service level based on the virtual channel linked lists. It is noted that although only two linked lists are shown being included in virtual channel linked lists 303, in other embodiments, any suitable number of virtual channel linked lists may be employed. For example, in some cases, linked lists for LLT, real time (or "RT"), and bulk transactions (also referred to as "best effort transactions") may be employed. In various embodiments, an arbitration circuit may select an oldest read request on a per virtual channel basis using head pointers for the linked lists included in virtual channel linked lists 303. To arbitrate across banks, the arbitration circuit may use head pointers for the linked lists in per virtual channel/per bank linked lists 302.

Page hit linked lists 304 includes linked lists 307a-b, each of which are associated with a particular page in a memory circuit. For example, linked list 307b includes read requests to a common page arranged in age order by respective links such as link 310 for example. It is noted that only a single link is depicted for the purposes of clarity. Each of linked lists 307a-b includes a head and a tail. For example, linked list 307b includes head 313 and tail 316.

Each of linked lists 307a-b are virtual channel aware such that only page hits associated with the same virtual channel are linked together. By making the page hit linked lists virtual channel aware, a memory controller circuit can ensure a desired bandwidth for the each of the virtual channels, while taking advantage of scheduling read requests to a common page for read accesses associated with a common virtual channel.

It is noted that a given read request may be present in multiple of the aforementioned linked lists. When such a read request is scheduled, the read request may be removed from each list in which it was included. As described above, removal of a read request from a linked list may be performed by relinking the list.

Figure 4:
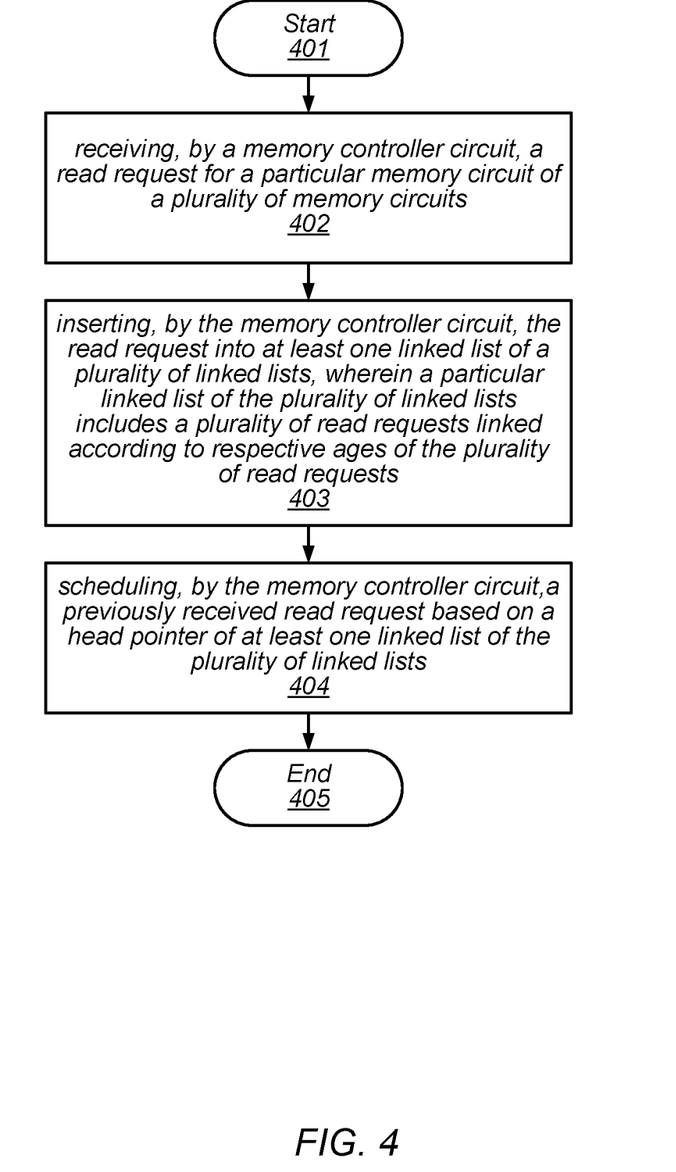
FIG. 4 illustrates a flow diagram depicting an embodiment of a method for operating a memory controller using linked lists.

Turning to FIG. 4, a flow diagram depicting an embodiment of a method for operating a memory controller circuit is illustrated. The method, which begins in block 401, may be applied to memory controller circuit 101 or other suitable memory controller circuit configured in a similar fashion to memory controller circuit 101.

The method includes receiving, by a memory controller circuit, a read request for a particular memory circuit of a plurality of memory circuits (block 402). In various embodiments, the read request may include an address that specifies particular storage locations with the particular memory circuit. The read request may be generated by a processor, processor core, or other agent coupled to the memory controller circuit via a communication bus that employs a particular communication protocol (commonly referred to as a "switch fabric").

The method further includes inserting, by the memory controller circuit, the read request into at least one linked list of a plurality of linked lists, wherein a particular linked list of the plurality of linked lists includes a plurality of read requests linked according to respective ages of the plurality of read requests (block 403). In various embodiments, inserting the read request into the at least one linked list includes copying information included in the read request into an entry in a register file or other suitable storage circuit as well as generating pointer information indicative of a preceding entry in the linked list and/or a subsequent entry in the linked list. In some cases, a similar procedure may be used to insert the read request into multiple linked lists used by the memory controller circuit.

The method also includes scheduling, by the memory controller circuit, a previously received read request based on head pointer of at least one linked list of the plurality of linked lists (block 404). An arbitration circuit included in the memory controller circuit may select a next read request to send to the plurality of memory circuits based on various criteria including, but not limited to, respective head pointers associated with the plurality of linked lists. In some cases, a particular head pointer may indicate an initial entry in a corresponding linked list. The method concludes in block 405.

During operation, different priority levels for read requests can create a situation where only read requests with high quality-of-service levels are sent to the memory circuits, leaving little of the available bandwidth to service read requests with lower quality-of-service levels. To remediate such problems, an age-based linked list may be employed. An embodiment of a method using an age-based linked list is illustrated in the flow diagram of FIG. 5. The method, which begins in block 501, may be applied to memory controller circuit 101 or any other suitable memory controller circuit.

Figure 5:
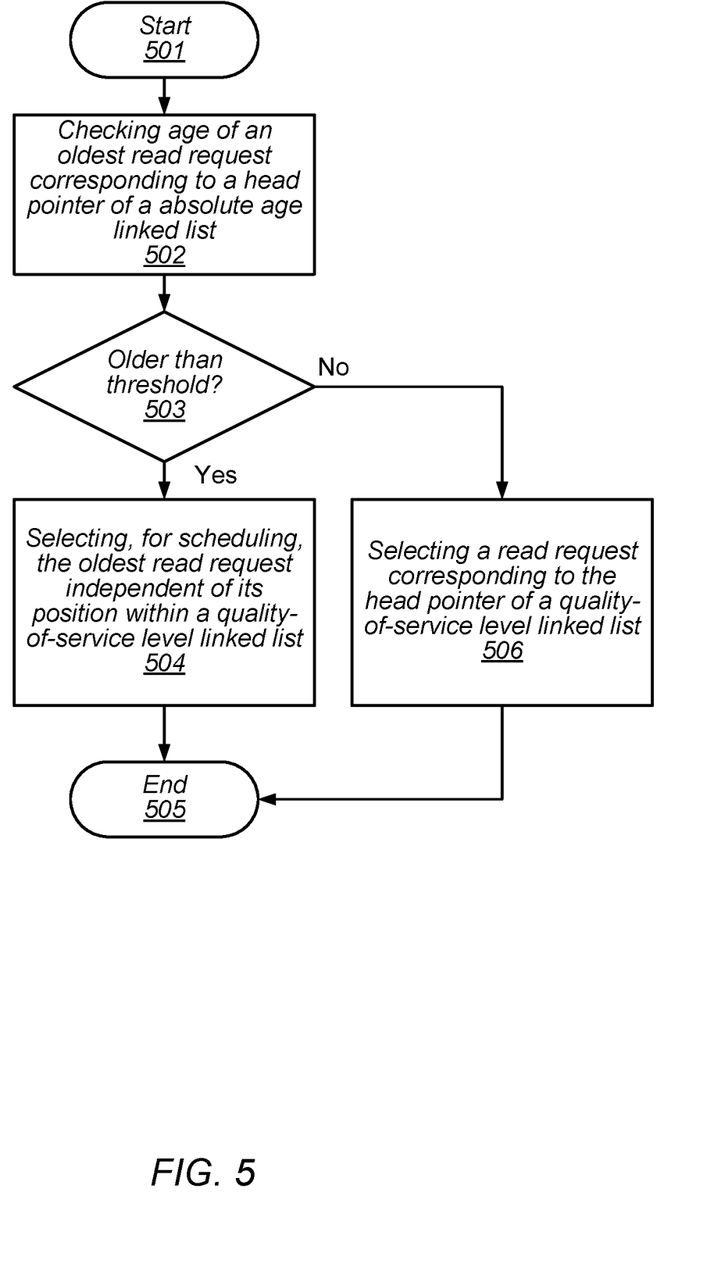
FIG. 5 illustrates a flow diagram depicting an embodiment of a method for scheduling memory access requests to guarantee progress of older memory access requests.

The method includes checking an age of an oldest read request corresponding to a head pointer of absolute age linked list (block 502). As described above, an absolute age linked list links various read request entries based on associated ages. The method may then depend on a comparison of the age to a threshold value (block 503). In various embodiments, the threshold value may be stored in a register or other suitable storage circuit included in the memory controller circuit. It is noted that the threshold value may be programmable based on computer system performance, available memory bandwidth, and the like.

If the age is older than the threshold value, then the method includes selecting, for scheduling, the oldest read request independent of its position within a quality-of-service linked list (block 504). It is noted that when age is older than the threshold value, the age becomes a primary factor in scheduling read requests. In cases where the age has not reached the threshold value, other factors, such as, e.g., a bank associated with the request, may be used in addition to the age information. By selecting the oldest read request independent of its associated quality-of-service level, old requests are guaranteed forward progress and eventual scheduling. Without such a provision, a read request with a low quality-of-service level may never be scheduled if read requests with higher quality-of-service levels are continually being received by the memory controller circuit. The method then concludes in block 505.

If, however, the age is not older than the threshold value, then the method includes selecting a read request corresponding to the head pointer of the quality-of-service linked list (block 506), thereby ensuring desired quality-of-service levels are achieved. The method then concludes in block 505.

During operation, different read requests may be targeted at a same page within the memory circuits. When a read request targets the same page as a previously received read request, it is referred to as a "page hit." Such read requests may be scheduled together to reduce a number of times the same page needs to be opened, thereby improving memory circuit utilization with the computer system, reducing DRAM power cost due to opening and closing pages, as well as improving performance of the computer system. An embodiment of a method for scheduling memory accesses taking into account page hits is illustrated in the flow diagram of FIG. 6. The method, which begins in block 601, may be applied to memory controller circuit 101 or any other suitable memory controller circuit.

Figure 6:
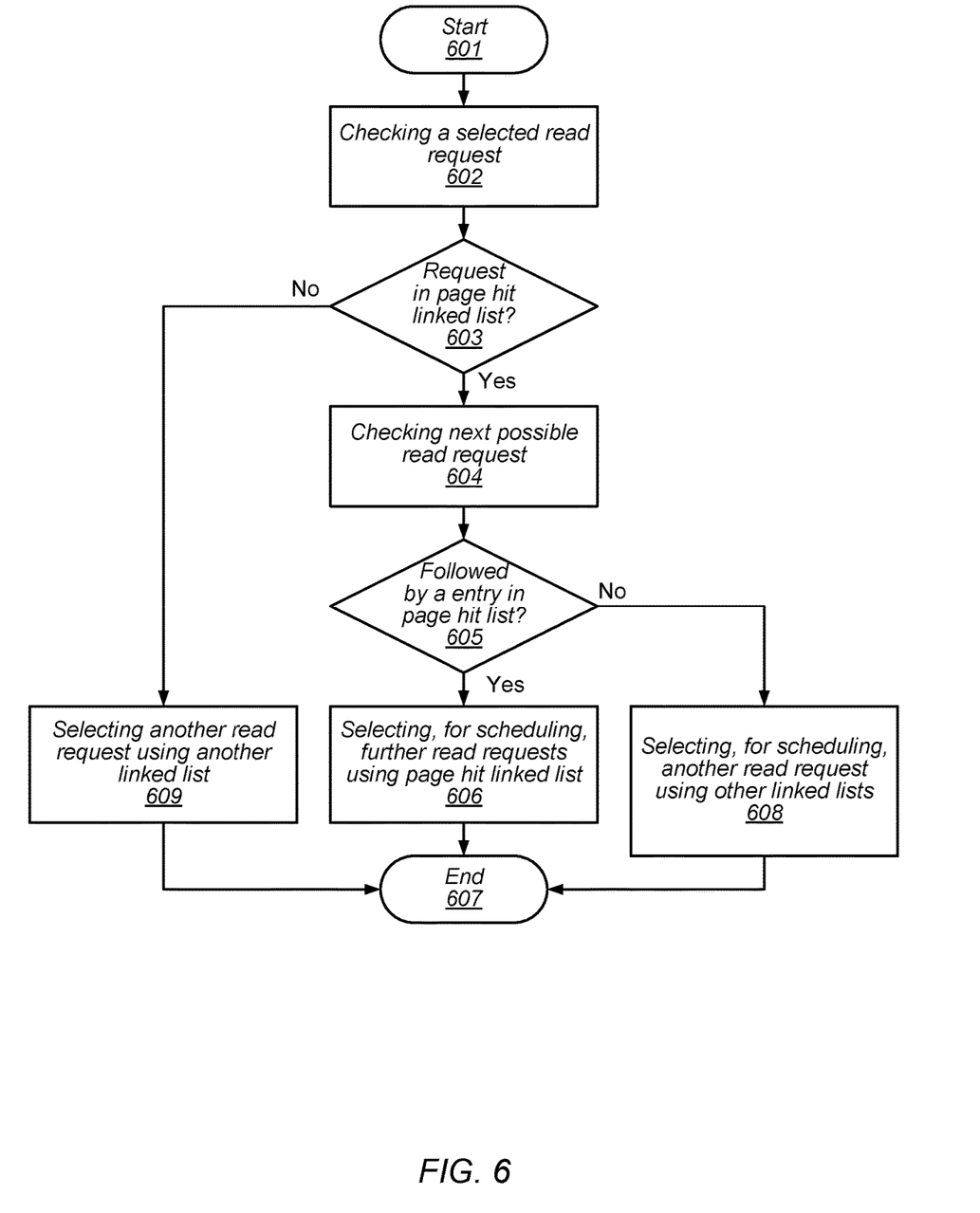
FIG. 6 illustrates a flow diagram depicting an embodiment of a method for scheduling memory access requests based on page hits.

The method includes checking a selected read request (block 602). In various embodiments, the selected read request may have been selected based on age, quality-of-service level, or any other suitable criteria or suitable combination thereof. The checking may include determining which of multiple linked lists include the selected read request. The method may then depend on the contents of a page hit linked list (block 603). As used and described herein, a page hit linked list is a linked list whose entries correspond to read requests each targeting a common page within a memory circuit. It is noted that each entry in a page hit linked list is also present in other linked lists, such as a per bank/per virtual channel linked list, a per virtual channel linked list, for example.

If the selected read request is not included in the page hit linked list, then the method includes selecting another read request using another linked list (block 609). As described above, the memory controller circuit may employ multiple linked lists to schedule read requests. For example, the memory controller circuit may use an age-based linked list, a particular one of multiple quality-of-service level based linked list, or any other suitable type of linked list. The method concludes in block 607.

If, however, the selected read request is included in the page hit linked list, then the method includes checking a next possible read request (block 604). In various embodiments, the memory controller circuit may use a pointer in another linked list, such as, e.g., a per-bank/per-virtual channel linked list to determine the next possible read request. The method may then depend if the previously selected read request is followed by an entry in the page hit linked list (block 605).

If the previously selected read request is followed by an entry in the page hit linked list, then the method includes selecting, for scheduling, another read request using the page linked list (block 606). The memory controller may elect to not use the next possible read request pointed to by other linked lists since there is another read request available for scheduling to the page opened to service the previously selected read requests. In some cases, the method may include checking a number of page hits to the currently open page. If the number of page hits is greater than a threshold value, the method may include closing the currently open page and selecting a next read request using another linked list. The method then concludes in block 607.

If, however, the previously selected read request is not followed by an entry in the page hit linked list, then the method includes selecting, for scheduling, another read request using other linked lists (block 608). Since the previously selected read request is not followed by another entry in the page hit linked list, there are no other requests to the same page available to process, so the next request to process can be selected using other linked lists such as those described above. In some cases, upon selecting the other read requests from either the page hit linked list or another linked list, the method depicted in the flow diagram of FIG. 6 may be repeated. The method then concludes in block 607.

In some cases, a read request received by a memory controller may be blocked by another request, such as a write request. As used and described herein, a blocked read request refers to a read request that has a dependency on an already pending access request. When this occurs, the blocked request may be skipped in favor of another read request that is not blocked. An embodiment of a method for dealing with blocked read request is depicted in the flow diagram of FIG. 7. The method, which begins in block 701, may be applied to memory controller circuit 101 or any other suitable memory controller circuit.

Figure 7:
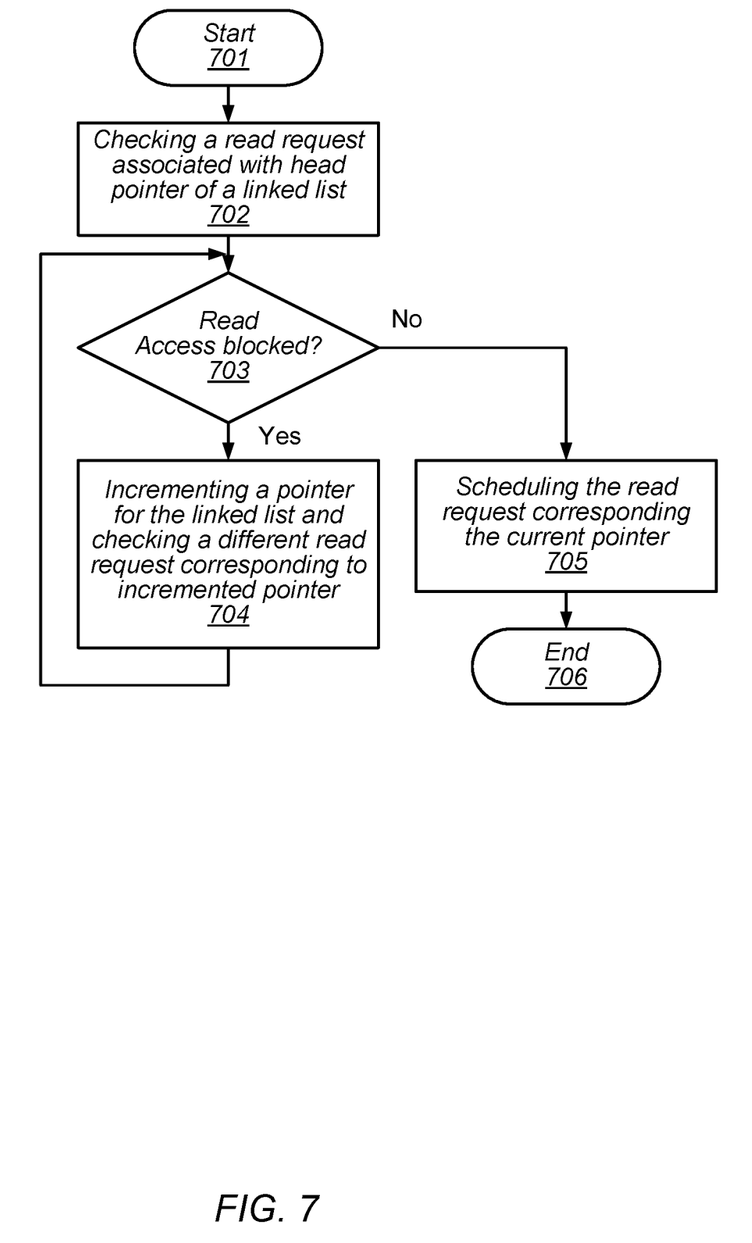
FIG. 7 illustrates a flow diagram depicting an embodiment of a method for dealing with blocked memory access requests during scheduling of memory access requests.

The method includes checking a read request associated with a head pointer of a linked list (block 702). In various embodiments, the memory controller circuit may use a particular head pointer of multiple head pointers associated with respective linked lists. As part of the checking process, the memory controller circuit may check dependencies of the read request. The method may then depend on the dependencies of the read request (block 703).

If the read request is blocked, then the method includes incrementing a pointer for the linked list and checking a different read request corresponding to the incremented pointer (block 704). By incrementing the pointer, the memory controller circuit can skip a blocked read request and begin processing a read request that is not blocked, thereby reducing latency of other read requests that were received after the blocked read request. As before, the checking operation may include checking dependencies of the different read request. Once the different read request has been checked, the method may proceed from block 703 as described above.

If, however, the read request is not blocked, then the method includes scheduling the read request corresponding to the current pointer (block 705). As part of the scheduling operation, the memory controller circuit may generate one or more commands that are sent to the memory circuits in order to execute the read request. In some cases, the memory controller circuit may wait for data to be returned from the memory circuits in fulfillment of the read request and then forward the data to the processor, processor core, or agent that initiated the read request. The method may then conclude in block 706.

As described above, a memory controller may skip a particular read request in a linked list in favor of processing a different read request. When this occurs, the different read request is no longer waiting to be scheduled and may be removed from the linked list by updating the links within the list. An embodiment of a method for relinking a linked list is illustrated in the flow diagram of FIG. 8. The method, which begins in block 801, may be applied to memory controller circuit 101 or any other suitable memory controller circuit.

Figure 8:
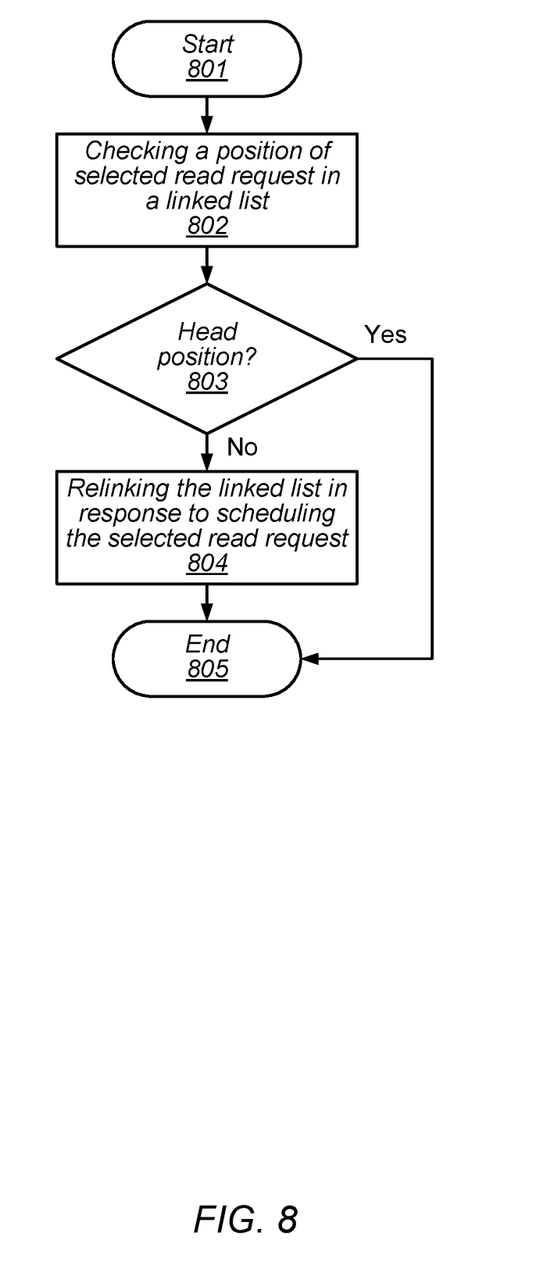
FIG. 8 illustrates a flow diagram for relinking a linked list used during scheduling of memory access requests.

The method includes checking a position of a selected read request in a linked list (block 802). The memory controller circuit may retrieve metadata or other associated information with the selected read request from an entry corresponding to the selected read request. The metadata or other associated data may include a pointer or other suitable data indicative of a position of selected read request within the linked list. The method may then depend on the position of the selected read request within the linked list (block 803).

If the position of the selected read request corresponds to the head (or top) position of the linked list, the method concludes in block 805. Alternatively, if the selected read request is not in the head (or top) position, then the method includes relinking the linked list in response to scheduling the selected read request (block 804). In various embodiments, the memory controller circuit may change a link associated with an entry in the linked list that is immediately prior to an entry corresponding to the selected read request. The link may be changed to point to an entry in the linked list that is immediately subsequent to the entry associated with the selected read request. By modifying the links of the entries immediately adjacent to the entry corresponding to the selected read request, the entry corresponding to the selected read request is effectively removed from the linked list. The method then concludes in block 805.

Figure 9:
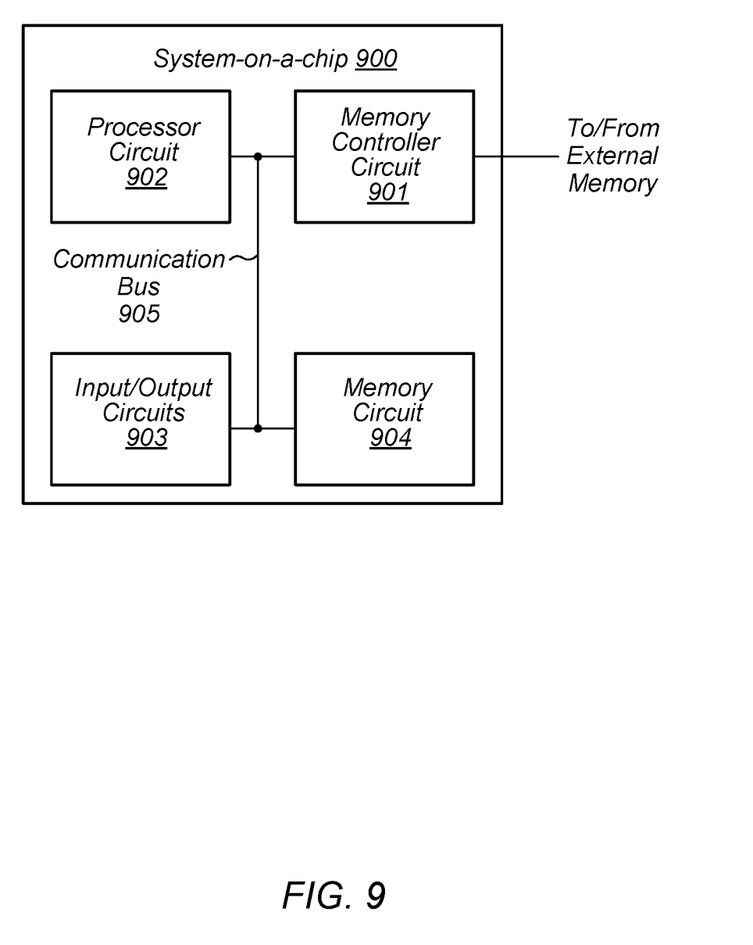
FIG. 9 depicts a block diagram of an embodiment of system-on-a-chip.

A block diagram of computer system is illustrated in FIG. 9. In the illustrated embodiment, the computer system 900 includes memory controller circuit 901, processor circuit 902, input/output circuits 903, and memory circuit 904, each of which may be configured to send requests and data (collectively transactions) the other circuit blocks using communication bus 905. In various embodiments, computer system 900 may be configured for use in a desktop computer, server, or in a mobile computing application such as, e.g., a tablet, laptop computer, or wearable computing device. Although four circuit blocks are depicted in the embodiment of FIG. 9, in other embodiments, any suitable number of circuit blocks may be included in computer system 900.

Memory controller circuit 901 is configured to schedule access requests to external memory. In various embodiments, memory controller circuit 901 may correspond to memory controller circuit 101 as illustrated in FIG. 1, and the access requests may include both memory read access requests and memory write access requests. Such access requests may be received from processor circuit 902, input/output circuits 903, or any other suitable circuit block included in computer system 900 (not shown).

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 904 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 9, a single memory circuit is depicted. In other embodiments, any suitable number of memory circuits may be employed.

Input/output circuits 903 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 903 may be configured to implement a version of Universal Serial Bus (USB) protocol or IEEE 1394 (Firewire®) protocol.

Input/output circuits 903 may also be configured to coordinate data transfer between computer system 900 and one or more devices (e.g., other computing systems or integrated circuits) coupled to computer system 900 via a network. In one embodiment, input/output circuits 903 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 903 may be configured to implement multiple discrete network interface ports.

Figure 10:
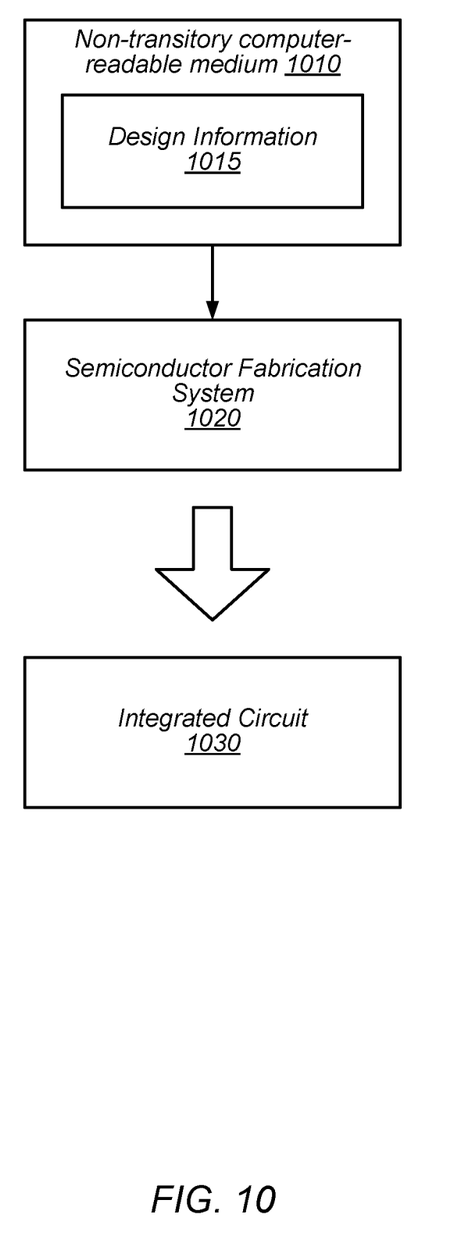
FIG. 10 illustrates a block diagram of a computer-readable medium storing design information for an integrated circuit.

FIG. 10 is a block diagram illustrating an example non-transitory computer-readable storage medium that stores circuit design information, according to some embodiments. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 2310 may be an installation medium, e.g., a CD-ROM, floppy disks, or tape device; a computer system memory or random-access memory such as DRAM, DDR RAM, SRAM, extended data out (EDO) RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of memory circuits including a plurality of pages; and
   a memory controller circuit coupled to the plurality of memory circuits, wherein the memory controller circuit is configured to:
      maintain a plurality of linked lists, wherein entries in a given one of the plurality of linked lists correspond to read requests associated with a particular memory structure associated with that linked list;
      receive a read request for one of the plurality of memory circuits;
      insert the read request into those ones of the plurality of linked lists corresponding to memory structures shared by the read request; and
      schedule a memory access to the plurality of memory circuits, wherein to schedule the memory access, the memory controller circuit is further configured to:
         select a first read request from a first linked list; and
         in response to a determination that the first read request is included in a second linked list, select a second read request from the second linked list, wherein read requests included in the second linked list are targeted to a common page of the plurality of pages.

2. The system of claim 1, wherein to schedule the schedule the memory access, the memory controller circuit is further configured to:
   skip the first read request, in response to a determination that the first read request is blocked by a pending write request;
   increment a pointer for the first linked list based on a link included in an entry in the first linked list corresponding to the first read request; and
   schedule a third read request based on the pointer for the first linked list.

3. The system of claim 2, wherein the memory controller circuit is further configured to relink, in the first linked list, the first read request to a fourth read request included in the first linked list, in response to scheduling the third read request.

4. The system of claim 1, wherein to the memory controller circuit is further configured to:
   skip the second read request in response to a determination that a number of read requests to common page is greater than a threshold number; and
   select a third read request from a third linked list, wherein the third read request is targeted at a different page of the plurality of pages.

5. The system of claim 1, wherein the read requests included in the first linked list are targeted to a common virtual channel memory structure.

6. The system of claim 1, wherein to select the first read request, the memory controller circuit is further configured to select the first read request in response to a determination that an age of the first read request is greater than a threshold age.

7. A method, comprising:
   maintaining, by a memory controller circuit, a plurality of linked lists, wherein entries in a given one of the plurality of linked lists correspond to read requests associated with a particular memory structure associated with that linked list;

receiving, by the memory controller circuit, a read request for one of a plurality of memory circuits that includes a plurality of pages;

inserting, by the memory controller circuit, the read request into those ones of the plurality of linked lists; and scheduling, by the memory controller circuit, a memory access to the plurality of memory circuits, wherein the scheduling includes:

selecting a first read request from a first linked list; and in response to determining that the first read request is included in a second linked list, selecting a second read request from the second linked list, wherein read requests included in the second linked list are targeted to a common page of the plurality of pages.

8. The method of claim 7, wherein scheduling the memory access includes skipping, by the memory controller circuit, the first read request in response to determining that the first read request is blocked by a pending write request.

9. The method of claim 8, further comprising:

incrementing, by the memory controller circuit, a pointer for the first linked list to generate an updated pointer; and selecting, by the memory controller circuit, a third read request based on the updated pointer.

10. The method of claim 9, further comprising, linking, by the memory controller circuit, in the first linked list, the first read request to a fourth read request, in response to scheduling the third read request.

11. The method of claim 7, wherein scheduling the memory access further includes:

skipping the second read request in response to determining that a number of read requests to common page is greater than a threshold number; and selecting a third read request from a third linked list, wherein the third read request is targeted at a different page of the plurality of pages.

12. The method of claim 7, wherein read requests included in the first linked list are targeted to a common bank memory structure included in the plurality of memory circuits.

13. The method of claim 7, wherein scheduling the memory access includes selecting the first read request in response to determining that an age of the first read request is greater than a threshold age.

14. The method of claim 7, wherein read requests included in first linked list are targeted to a common virtual channel memory structure included in the plurality of memory circuits.

15. A non-transitory computer-readable storage medium having design information stored thereon, wherein the design information specifies a design of at least a portion of a hardware integrated circuit in a format recognized by a semiconductor fabrication system that is configured to use the design information to produce the hardware integrated circuit according to the design information, wherein the design information specifies that the hardware integrated circuit comprises:

a memory controller circuit configured to:

maintain a plurality of linked lists, wherein entries in a given one of the plurality of linked lists correspond to read requests associated with a particular memory structure associated with that linked list;

receive a read request for one of a plurality of memory circuits that includes a plurality of pages;

insert the read request into those ones of the plurality of linked lists corresponding to memory structures shared by the read request; and schedule a memory access to the plurality of memory circuits, wherein to schedule the memory access, the memory controller circuit is further configured to:

select a first read request from a first linked list in response to a determination that the first read request is included in a second linked list, select a second read request from the second linked list, wherein read requests included in the second linked list are targeted to a common page of the plurality of pages.

16. The non-transitory computer-readable storage medium of claim 15, wherein to schedule the memory access, the memory controller circuit is further configured to:

skip the first read request, in response to a determination that the first read request is blocked by a pending write request;

increment a pointer for the first linked list based on a link included in an entry in the first linked list corresponding to the first read request; and schedule a third read request based on the pointer for the first linked list.

17. The non-transitory computer-readable storage medium of claim 16, wherein the memory controller circuit is further configured to relink, in the first linked list, the first read request to a fourth read request included in the first linked list, in response to scheduling the third read request.

18. The non-transitory computer-readable storage medium of claim 15, wherein to the memory controller circuit is further configured to:

skip the second read request in response to a determination that a number of read requests to common page is greater than a threshold number; and select a third read request from a third linked list, wherein the third read request is targeted at a different page of the plurality of pages.

19. The non-transitory computer-readable storage medium of claim 15, wherein the read requests included in the first linked list are targeted to a common virtual channel memory structure.

20. The non-transitory computer-readable storage medium of claim 15, wherein to schedule the memory access, the memory controller circuit is further configured to select the first read request in response to a determination that an age of the first read request is greater than a threshold age.

* * * * *